(12) United States Patent
Lee et al.

(10) Patent No.: US 9,141,406 B2
(45) Date of Patent: Sep. 22, 2015

(54) METHOD AND SYSTEM TO PROVIDE A USER INTERFACE WITH RESPECT TO A PLURALITY OF APPLICATIONS

(71) Applicant: SAMSUNG Electronics Co., Ltd., Suwon-si, Gyeonggi-do (KR)

(72) Inventors: Jong-hwa Lee, Suwon-si (KR); Kyung-do Park, Suwon-si (KR); Mi-ra Eom, Suwon-si (KR); Ji-won Im, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 426 days.

(21) Appl. No.: 13/633,933

(22) Filed: Oct. 3, 2012

(65) Prior Publication Data

US 2013/0086510 A1 Apr. 4, 2013

(30) Foreign Application Priority Data

Oct. 4, 2011 (KR) .......................... 10-2011-0100766

(51) Int. Cl.
*G06F 3/0481* (2013.01)
*G06F 9/44* (2006.01)
*G06F 3/0482* (2013.01)
*G06F 3/0489* (2013.01)

(52) U.S. Cl.
CPC ............ *G06F 9/4443* (2013.01); *G06F 3/0482* (2013.01); *G06F 3/0489* (2013.01)

(58) Field of Classification Search
CPC ...... G06F 3/0238; G06F 3/048; G06F 3/0481; G06F 9/44543; G06F 3/0482; G06F 9/44; G06F 9/4443
See application file for complete search history.

(56) References Cited

U.S. PATENT DOCUMENTS

| | | | | |
|---|---|---|---|---|
| 6,114,978 | A * | 9/2000 | Hoag | 341/23 |
| 6,266,060 | B1 * | 7/2001 | Roth | 715/853 |
| 2007/0180407 | A1 * | 8/2007 | Vahtola | 715/847 |
| 2007/0234235 | A1 * | 10/2007 | Scott | 715/825 |
| 2008/0172619 | A1 | 7/2008 | Carrier et al. | |
| 2008/0300886 | A1 * | 12/2008 | Patch | 704/275 |
| 2010/0269039 | A1 * | 10/2010 | Pahlavan et al. | 715/702 |
| 2011/0007351 | A1 * | 1/2011 | Kurumasa et al. | 358/1.15 |
| 2011/0066983 | A1 | 3/2011 | Kim | |
| 2011/0310022 | A1 * | 12/2011 | Simons | 345/169 |
| 2013/0132899 | A1 * | 5/2013 | Scott | 715/810 |
| 2013/0326413 | A1 * | 12/2013 | Croft et al. | 715/811 |

OTHER PUBLICATIONS

Extended European Search Report dated Dec. 17, 2012 issued in EP Application No. 12187035.6.

* cited by examiner

*Primary Examiner* — Xiomar L Bautista
(74) *Attorney, Agent, or Firm* — Staas & Halsey LLP

(57) ABSTRACT

A method and apparatus provides a user interface with respect to a plurality of applications and includes storing operation information regarding common operations performed in the plurality of applications of a device, generating a function window for performing at least one operation performed in the plurality of applications based on the stored operation information, and displaying the generated function window.

22 Claims, 8 Drawing Sheets

FIG. 5

| FUNCTION NAME (50) | APPLICATION NAME (52) | RELATED FUNCTION (54) |
|---|---|---|
| COPY | A, B, ... | PASTE |
| CUT | A, B, ... | PASTE |
| UNDO | B, C, ... | REFRESH |
| ⋮ | ⋮ | ⋮ |

FIG. 6

| APPLICATION NAME (60) | FUNCTION NAME (62) | HOW MANY TIMES OPERATIONS ARE PERFORMED (64) |
|---|---|---|
| A | COPY | 7 |
|   | CUT | 3 |
|   | UNDO | 15 |
|   | ⋮ | ⋮ |
| B | UNDO | 13 |
|   | REFRESH | 7 |
|   | ⋮ | ⋮ |
| ⋮ | ⋮ | ⋮ |

# METHOD AND SYSTEM TO PROVIDE A USER INTERFACE WITH RESPECT TO A PLURALITY OF APPLICATIONS

CROSS-REFERENCE TO RELATED APPLICATIONS

This application claims priority under 35 U.S.C. 119 from Korean Patent Application No. 10-2011-0100766, filed on Oct. 4, 2011, in the Korean Intellectual Property Office, the disclosure of which is incorporated herein in its entirety by reference.

BACKGROUND OF THE INVENTION

1. Field of the Invention

The present general inventive concept relates to a method and system to provide a user interface with respect to a plurality of applications, and more particularly, to a method and system to provide a user interface to perform common functions of a plurality of applications.

2. Description of the Related Art

A variety of terminals, such as a personal computer (PC) including a touch pad, a personal digital assistant (PDA), a smart phone, a portable media player (PMP), an MP3 player, etc., have become popular. A user interface of an application of each terminal is prepared in accordance with an input device, such as a mouse, a keyboard, a remote controller, a touch, etc. Furthermore, since the terminals include various executable applications, users have difficulty in recognizing applications and knowing what functions are performed by the applications, and also in inputting a command for executing a desired function of a specific application in a timely fashion.

It is inconvenient for users to input commands for executing a plurality of applications. The terminals do not provide common shortcut key functions with respect to the plurality of applications. Furthermore, the terminals do not provide effective selection and arrangement of the shortcut keys.

SUMMARY OF THE INVENTION

The present general inventive concept provides a method and system to provide a user interface capable of providing shortcut keys for common operations performed in a plurality of applications.

The present general inventive concept also provides a method and system to provide a user interface with respect to a plurality of applications such that shortcut keys for common operations performed in a plurality of applications are effectively selected and arranged.

The present general inventive concept also provides a method and system to provide a user interface capable of effectively displaying a shortcut key related to an executed shortcut key among shortcut keys included in a function window.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of providing a user interface with respect to a plurality of applications, the method including storing operation information regarding common operations performed in the plurality of applications of a device, generating a function window to perform at least one operation performed in the plurality of applications based on the stored operation information, and displaying the generated function window.

The generated function window may include shortcut keys corresponding to the common operations.

The method may further include generating a setting window including a plurality of shortcut keys with respect to the common operations performed in the plurality of applications, and receiving a user selection input through the generated setting window. The generating of the function window may include arranging shortcut keys corresponding to operations selected based on the user selection input.

The storing of the operation information may include storing the operation information regarding the common operations performed in the plurality of applications based on a user input signal.

The generating of the function window may include selecting shortcut keys of operations to be included in the function window based on numbers of times the common operations are performed in the plurality of applications.

The method may further include: if the shortcut keys included in the function window are selected, performing operations corresponding to the selected shortcut keys with respect to an activated application.

The generating of the function window may include, if the operations corresponding to the selected shortcut keys are performed, highlighting and displaying shortcut keys related to the selected shortcut keys.

The generating of the function window may include rearranging the shortcut keys according to an activated application.

The displaying of the generated function window may include displaying the function window as a popup window.

The foregoing and/or other features and utilities of the present general inventive concept may also be achieved by providing an apparatus to provide a user interface with respect to a plurality of applications, the apparatus including an operation information storage unit to store operation information regarding common operations performed in the plurality of applications of a device, a function window generating unit to generate a function window to perform at least one operation performed in the plurality of applications based on the stored operation information, and a display unit to display the generated function window.

The generated function window may include shortcut keys corresponding to the common operations.

The apparatus may further include a setting window generating unit to generate a setting window including a plurality of shortcut keys with respect to the common operations performed in the plurality of applications. The function window generating unit may arrange shortcut keys corresponding to operations selected based on a user selection input through the generated setting window.

The operation information storage unit may store the operation information regarding the common operations performed in the plurality of applications based on a user input signal.

The operation information storage unit may select stored numbers of times the common operations are performed in the plurality of applications, wherein the function window generating unit selects shortcut keys of operations to be included in the function window based on the numbers.

The apparatus may further include an operating performing unit f to perform operations corresponding to the selected shortcut keys with respect to an activated application when the shortcut keys included in the function window are selected.

The function window generating unit may highlight and display shortcut keys related to the selected shortcut keys the operations corresponding to the selected shortcut keys are performed.

The function window generating unit may rearrange the shortcut keys according to an activated application.

The foregoing and/or other features and utilities of the present general inventive concept may also be achieved by providing a computer readable recording medium having recorded thereon a computer program to execute a method including storing operation information regarding common operations performed in the plurality of applications of a device, generating a function window to perform at least one operation performed in the plurality of applications based on the stored operation information, and displaying the generated function window.

The foregoing and/or other features and utilities of the present general inventive concept may also be achieved by providing an apparatus including an operation performing unit to perform one or more operations of one or more applications, and a window generating unit to generate a user interface with a function window having one or more shortcut keys corresponding to performed common operations of the applications, and a display unit to display the generated user interface.

The apparatus may further include a setting window generating unit to generate a setting window having a plurality of shortcut keys corresponding to performed operations of the applications. The one or more shortcut keys of the function window may be selected from the shortcut keys of the setting window.

The shortcut keys of the performed common operations are selected and arranged according to a user preference.

The foregoing and/or other features and utilities of the present general inventive concept may also be achieved by providing an apparatus including an operation performing unit to perform one or more operations of one or more applications, an operation information storage unit to store operation information regarding common operations performed in the applications, a window generating unit to generate a user interface with a function window having one or more shortcut keys corresponding to performed common operations of the applications, and a display unit to display the generated user interface.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 is a related function table stored in an operation information storage unit of an apparatus to provide a user interface according to an embodiment of the present general inventive concept;

FIG. 6 is a table illustrating frequencies of operations performed in an apparatus according to an embodiment of the present general inventive concept;

DETAILED DESCRIPTION OF EMBODIMENTS

Figure 1:
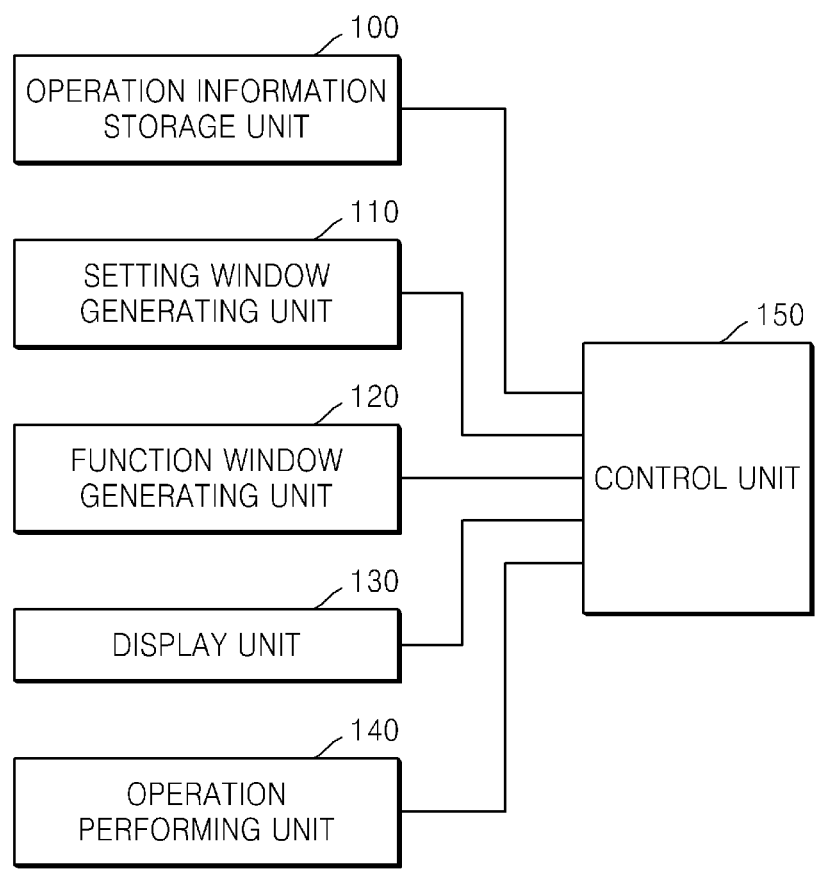
FIG. 1 is a block diagram illustrating an apparatus f to provide a user interface with respect to a plurality of applications according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Throughout the present specification, it will be understood that when an element, such as a layer, a region, or a substrate, is referred to as being 'connected to' or 'coupled to' another element, it may be directly connected or coupled to the other element or may be electrically connected or coupled to the other element via another element. It will be further understood that terms, such as 'have' and 'include', when used in this specification, specify the presence of stated features, integers, steps, operations, elements, and/or components, but do not preclude the presence or addition of one or more other features, integers, steps, operations, elements, components, and/or groups thereof.

Expressions such as "at least one of," when preceding a list of elements, modify the entire list of elements and do not modify the individual elements of the list.

FIG. 1 is a block diagram illustrating an apparatus to provide a user interface with respect to a plurality of applications according to an embodiment of the present general inventive concept.

Referring to FIG. 1, the apparatus includes an operation information storage unit 100, a setting window generating unit 110, a function window generating unit 120, a display unit 130, an operation performing unit 140, and a control unit 150.

The apparatus may be a computer apparatus, a mobile communication device, a tablet computer apparatus, an audio and video storing and processing apparatus, an audio and video storing and reproducing apparatus, a social networking apparatus, a photographing apparatus, and so on. The apparatus may have an external interface unit to communicate with an external device to transmit and receive data to perform a function thereof in the apparatus, and an internal interface to receive user data, input and command to control or select an application or a function thereof.

The apparatus may have a plurality of applications. The plurality of application may correspond to programs stored in a memory unit of the apparatus or programs received from an external device. The apparatus may automatically initiate the application or manually initiate the application by a user through a user command or user input signal. The application may be displayed on a screen of a display unit of the apparatus, and an application screen may be displayed on the display unit of the application according to a selection of the application to select at least one of operations of the application to perform a function thereof.

Figure 10:
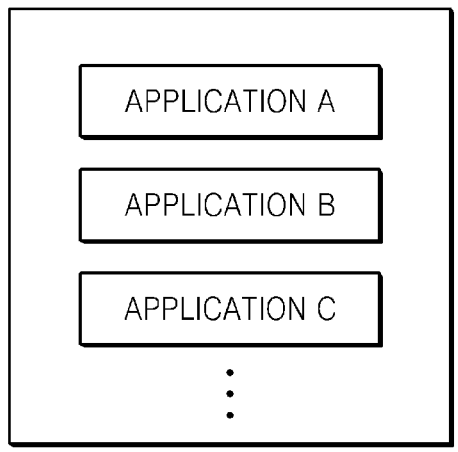
FIGS. 10 and 11 are views illustrating a main menu and a sub menu as user interfaces of an apparatus according to an embodiment of the present general inventive concept.
Figure 11:
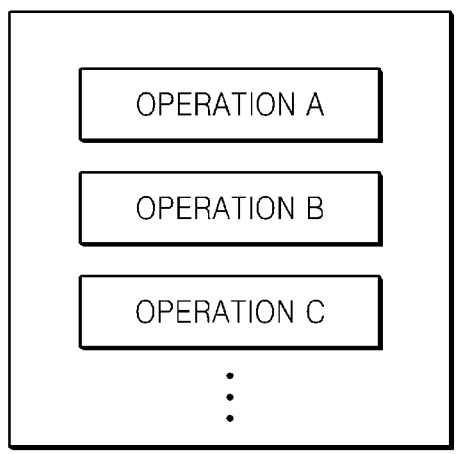

The apparatus may display a main menu as a user interface on the display unit 130 such that a user can select at least one of applications, for example, application A, application B, application C, etc, as illustrated in FIG. 10. The apparatus may also display a sub menu as a user interface on the display unit 130 such that a user can select at least on of operations, for example, operation a, operation b, operation c, etc., of the selected application, as illustrated in FIG. 11.

The operation information storage unit 100 stores operation information regarding common operations performed in the plurality of applications included in the apparatus. The operation information storage unit 100 may collect and store operations performed in the applications installed in the apparatus and commands used to perform the operations. For example, the operation information storage unit 100 may store operation information indicating that "Ctrl+C" is used to perform a function "copy" of an "application A" and an "application B" and that "Ctrl+Z" is used to perform a function "undo" of the "application B" and the "application C."

Also, the operation information storage unit 100 may store information regarding the common operations performed in the plurality of applications based on a user input signal. Information regarding an operation and command of each application installed in the apparatus may be previously determined by a user.

Also, the operation information storage unit 100 may store information regarding the number of times operations are performed in the applications, and may also store information on whether each performed operation of the application matches or correspond to one or more performed operations of other applications. An example of the operation information stored in the operation information storage unit 100 will be described in more detail with reference to FIGS. 5 and 6.

The setting window generating unit 110 generates a setting window to be displayed on a screen of the display unit 130 of the apparatus to generate a function window that will be described later. The setting window generating unit 110 may generate the setting window based on the operation information stored in the operation information storage unit 100. The setting window generating unit 110 may check the common operations to be performed in the plurality of applications installed in the apparatus, determine whether one or more shortcut keys match or correspond to the common operations, and generate the setting window. A portion of the shortcut keys included in the setting window may be selected according to the user input signal and included in the function window that will be described later.

Also, the setting window generating unit 110 may determine the shortcut keys to be included in the setting window based on a user input. In this case, the user may input at least one of icons corresponding to the shortcut keys, operations corresponding to the shortcut keys, commands used to perform operations, and applications for which operations are performed. An additional window for the user input may be displayed on a screen of the display unit 130 of the apparatus.

An example of the setting window including the plurality of shortcut keys with respect to the plurality of operations will be described in more detail with reference to FIGS. 2 and 3 later.

The function window generating unit 120 generates the function window to perform one or more operations corresponding to the applications installed in the apparatus. The function window may include the shortcut keys corresponding to the common operations to be performed in the plurality of applications installed in the apparatus.

Also, the function window generating unit 120 may select the shortcut keys corresponding to one or more operations to be included in the function window based on the number of times each operation is performed. For example, the function window generating unit 120 may sum the numbers of times the operations are performed in the applications, select operations to be included in the function window based on the summed number of times the operations are performed, and arrange the shortcut keys of the selected operations. Also, the function window generating unit 120 may include the shortcut keys selected by the user from the shortcut keys displayed in the setting window in the function window, but the present invention is not limited thereto.

Also, the function window generating unit 120 may rearrange the shortcut keys included in the function window according to a type of an activated application. The function window generating unit 120 may confirm the numbers of times the operations are performed in the applications, and first arrange the shortcut keys corresponding to operations frequently performed in a currently activated application on the function window. For example, if the "application A" performs a function "copy" 7 times, a function "cut" 3 times, and a function "paste" 15 times, the function window generating unit 120 may rearrange the shortcut keys on the function window in the order of "paste," "copy," and "cut."

Also, when one of the operations arranged on the function window is selected, and the selected operation is performed, the function window generating unit 120 may highlight the shortcut key corresponding to an operation related to the performed operation. For example, if the function "copy" is selected from the function window and performed, the function window generating unit 120 may highlight the shortcut key corresponding to the function "paste" related to the function "copy".

The display unit 130 displays the generated setting window and function window as a user interface. The display unit 130 may display the function window on a screen in response to the user input signal. For example, if the user simultaneously touches three points on the screen of the apparatus, the display unit 130 may display the function window.

Also, the display unit 130 may first display the function window and, when the user changes the shortcut keys included in the function widow, display the setting window, but the present general inventive concept is not limited thereto.

When the user selects one of the shortcut keys included in the function window, the operation performing unit 140 performs an operation corresponding to the selected shortcut key. When the user selects one of the shortcut keys included in the function window, the operation performing unit 140 may confirm an activated application, and perform an operation corresponding to the selected shortcut key with respect to the confirmed application.

If a plurality of applications are activated, the operation performing unit 140 may perform an operation with respect to an application selected by the user.

The control unit 150 controls a whole operation of the apparatus, and controls the operation information storage unit 100, the setting window generating unit 110, the function window generating unit 120, the display unit 130, and the operation performing unit 140 in such a way that the apparatus can generate the function window and the setting window with respect to the plurality of applications and perform an operation corresponding to a shortcut key selected by the user.

An example of a setting window and a function window according to an embodiment of the present general inventive concept will now be described with reference to FIG. 2 below.

Figure 2:
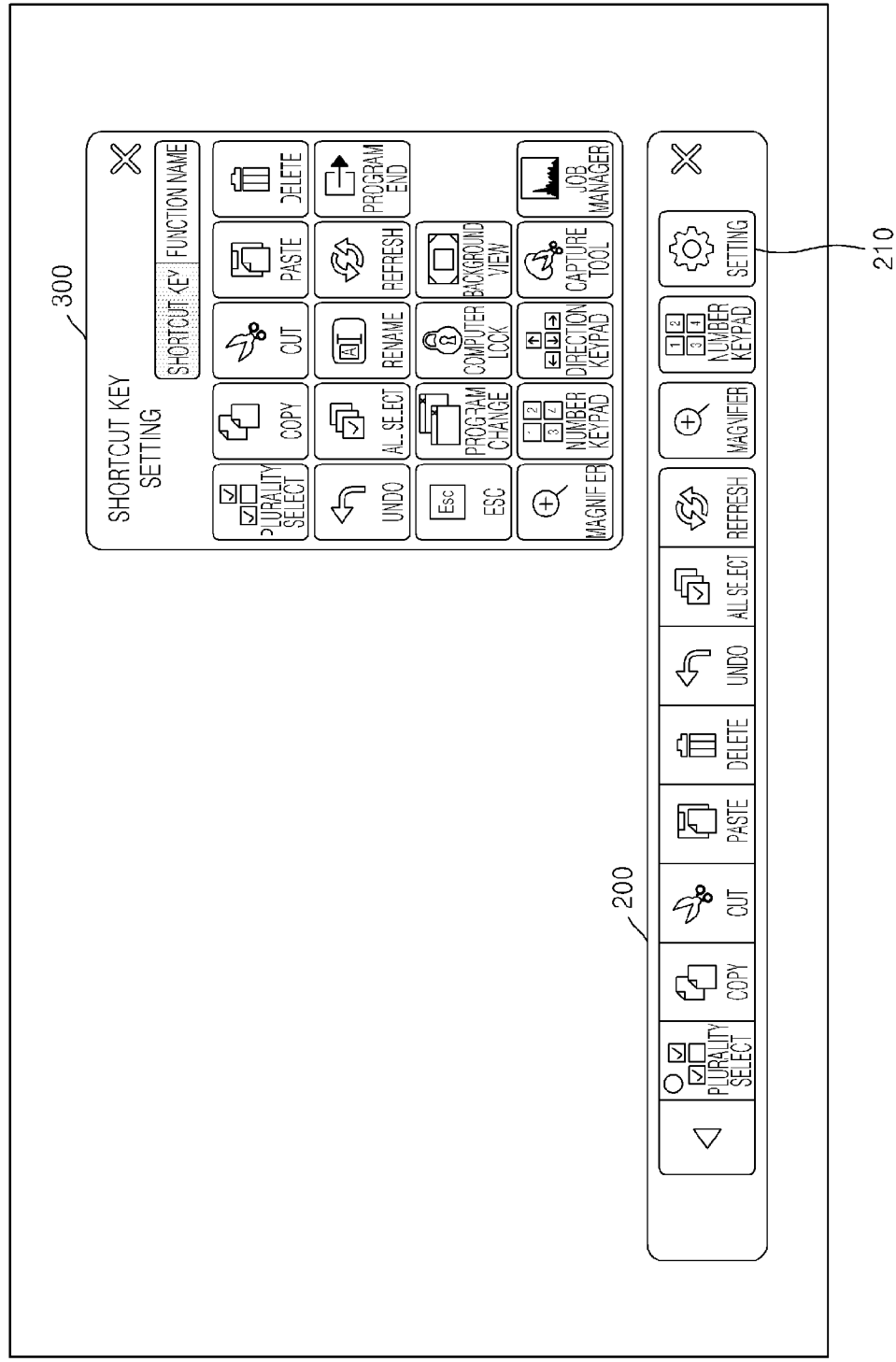
FIG. 2 is a diagram illustrating an user interface with a setting window and a function window according to an embodiment of the present general inventive concept.

FIG. 2 is a diagram illustrating a function window 200 and a setting window 300 as a user interface of an apparatus according to an embodiment of the present general inventive concept.

Referring to FIG. 2, the function window 200 and the setting window 300 may be displayed on a screen of a display unit of the apparatus. The setting window 300 may display a plurality of shortcut keys with respect to common operations to be performed in a plurality of applications of the apparatus. The shortcut keys may display icons and operation names.

Also, the function window 200 may display shortcut keys selected by a user from among the shortcut keys displayed in the setting window 300. The shortcut keys displayed on the function window 200 may be arranged based on the number of times an operation corresponding to each shortcut key is performed. Also, the shortcut keys displayed in the function window 200 may be rearranged according to a type of an activated application, but the present invention is not limited thereto.

Also, if a setting key 210 is selected on the function window 200, the setting window 300 may be displayed.

An example of a setting window and a function window, according to another embodiment of the present invention, will now be described with reference to FIG. 3 below.

Figure 3:
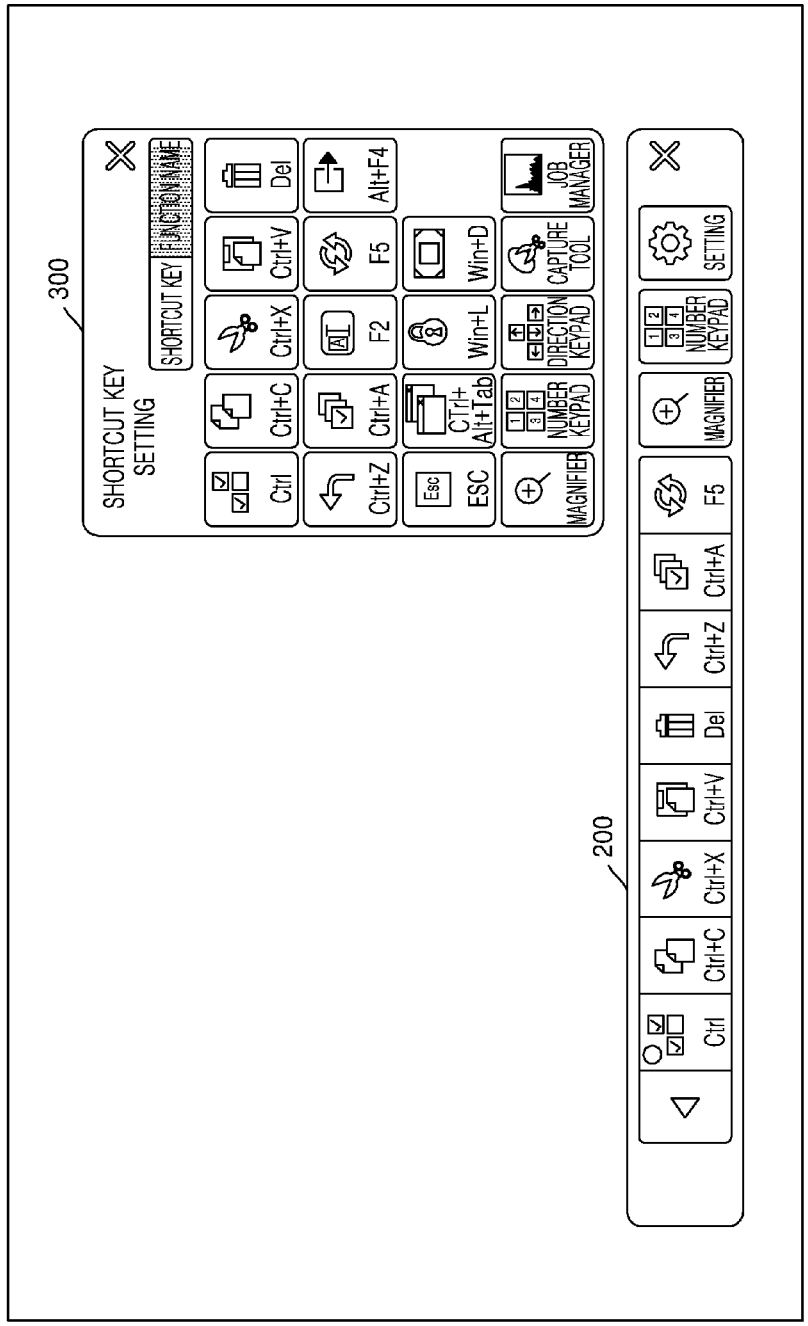
FIG. 3 is a diagram illustrating an user interface with a setting window and a function window according to an embodiment of the present general inventive concept.

FIG. 3 is a diagram illustrating the function window 200 and the setting window 300 as a user interface of the apparatus according to an embodiment of the present general inventive concept.

Referring to FIG. 3, the setting window 300 may display a plurality of shortcut keys with respect to common operations to be performed in a plurality of applications of an apparatus. The shortcut keys may display icons and commands.

An example of a related function that is highlighted and displayed in a function window, according to an embodiment of the present general inventive concept, will now be described with reference to FIG. 4 below.

Figure 4:
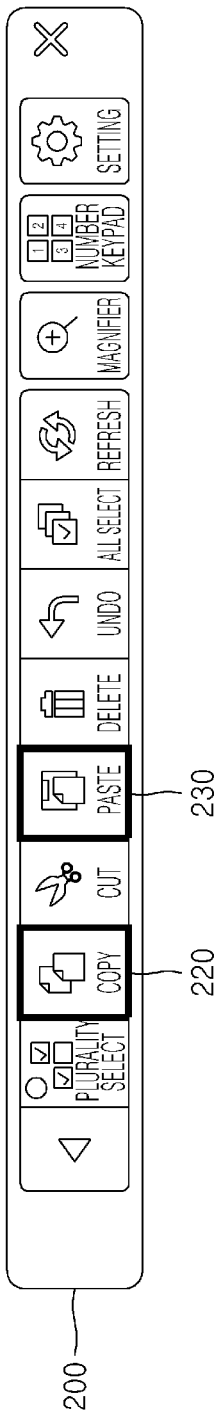
FIG. 4 is a diagram illustrating a related function that is highlighted and displayed in a function window of a user interface according to an embodiment of the present general inventive concept.

FIG. 4 is a diagram of a related function that is highlighted and displayed in the function window 200, according to an embodiment of the present invention.

Referring to FIG. 4, if a copy key 220 is selected and an operation "copy" is performed on the function window 200, a paste key 230 that is a shortcut key related to the copy key 220 may be highlighted. In this case, a boundary of the shortcut key may be displayed in a different color, a size thereof may be changed, or the shortcut key may be displayed in a different color, but the present invention is not limited thereto.

An example of a related function table stored in an operation information storage unit of an apparatus according to an embodiment of the present general inventive concept will now be described with reference to FIG. 5 below.

FIG. 5 is a related function table stored in the operation information storage unit 100 of FIG. 1 according to an embodiment of the present general inventive concept.

Referring to FIG. 5, the related function table according to the present embodiment includes a function name field 50, an application name field 52, and a related function field 54.

Names of common operations to be performed in a plurality of applications of an apparatus are recorded in the function name field 50.

Names of applications supporting operations recorded in the function name field 50 are recorded in the application name field 52. Names of related operations with respect to operations recorded in the function name field 50 are recorded in the related function field 54. For example, the application A and the application B supporting an operation "copy" may be recorded in the application name field 52, and a function "paste" corresponding to the operation "copy" may be recorded in the related function field 54.

Therefore, the function window generating unit 120 may use the related function table to highlight and display shortcut keys of operations corresponding to performed operations.

An example of a table indicating how many times operations are performed, according to an embodiment of the present general inventive concept, will now be described with reference to FIG. 6 below.

FIG. 6 is a table indicating how many times operations are performed in an apparatus according to an embodiment of the present general inventive concept.

Referring to FIG. 6, the table indicating how many times operations are performed includes an application name field 60, a function name field 62, and a field 64 indicating how many times operations are performed. The table may be stored in the operation information storage unit 100 of the apparatus.

Names of applications of an apparatus are recorded in the application name field 60. Names of operations supported by the applications are recorded in the function name field 62. Numbers of how many times operations are performed are recorded in the field 64. For example, operations "copy," "cut," and "paste" supported by the application A may be recorded in the function name field 62, and the numbers of times operations are performed, "7," "13," and "15," respectively corresponding to the operations "copy," "cut," and "paste" may be recorded in the field 64.

Therefore, the function window generating unit 120 may use the table indicating how many times operations are performed to select shortcut keys of operations to be displayed in a function window. In this case, the function window generating unit 120 may sum numbers of times operations are performed and select shortcut keys of operations to be displayed in the function window 200.

Also, the function window generating unit 120 may rearrange the shortcut keys displayed in the function window according to a type of an activated application by using the table indicating how many times operations are performed. For example, if the application A is activated, the function window generating unit 120 may rearrange the shortcut keys displayed in the function window in the order of the operations "paste," "copy," and "cut."

A method of generating a user interface according to an embodiment of the present general inventive concept will now be described with reference to FIG. 7 below.

Figure 7:
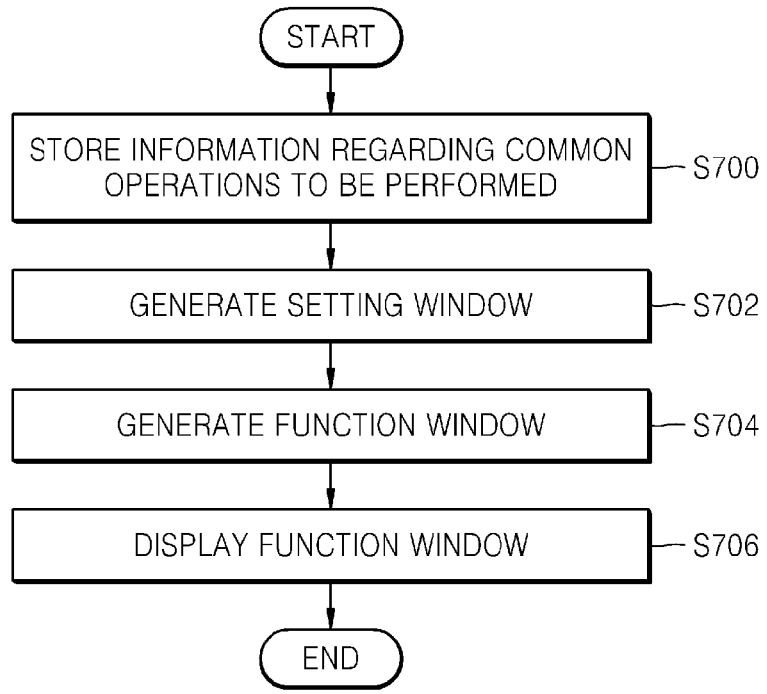
FIG. 7 is a flowchart illustrating a method of generating a user interface according to an embodiment of the present inventive concept.

FIG. 7 is a flowchart illustrating a method of generating a user interface in an apparatus according to an embodiment of the present general inventive concept.

In operation S700, operation information regarding common operations to be performed in a plurality of applications of the apparatus is stored. In operation S700, the apparatus may collect and store operations to be performed in the applications installed therein and commands used to perform the operations. For example, the apparatus may store the operation information indicating that a function "copy" is performed in an "application A" and an "application B" using "Ctrl+C" and a function "undo" is performed in the "application B" and the "application C" using "Ctrl+Z."

Furthermore, in operation S700, the apparatus may store information regarding the common operations to be performed in the plurality of applications based on a user input signal. Information regarding operations and commands of the respective applications of the apparatus may be previously determined.

Furthermore, in operation S700, the apparatus may store information regarding the number of times the operations are performed in the applications, and match other related operations for each operation performed in the applications.

In operation S702, a setting window is generated to be displayed on a screen of a display unit of the apparatus. In operation S702, the apparatus may generate the setting window based on the operation information stored therein. The apparatus may confirm the common operations to be performed in the plurality of applications thereof, match shortcut keys to the respective common operations, and generate the setting window. A portion of the shortcut keys included in the setting window may be selected according to a user input signal, and the selected shortcut keys may be included in a function window.

In operation S704, the function window is generated to be displayed on a screen of the display unit of the apparatus. In operation S704, the apparatus generates the function window to perform the operations in the applications thereof. Also, the apparatus may select shortcut keys of the operations to be included in the function window based on the number of times each operation is performed. For example, the apparatus may sum the numbers of times the operations are performed in the applications, select the operations to be included in the function window based on the summed number of times the operations are performed, and arrange shortcut keys of the selected operations. Also, the apparatus may include the shortcut keys selected by a user from the shortcut keys displayed in the setting window in the function window, but the present general inventive concept is not limited thereto.

In operation S706, the generated function window is displayed. In operation S706, the apparatus may display the generated setting window and function window. The apparatus may display the function window on a screen in response to a user input signal. For example, when the user simultaneously touches a number of points, for example, three points on a screen of the apparatus, the apparatus may display the function window.

Also, in operation S706, the apparatus may first display the function window and, when the user changes the shortcut keys included in the function window, the apparatus may display the setting window, but the present general inventive concept is not limited thereto.

A method of arranging shortcut keys on a function window according to an embodiment of the present general inventive concept will now be described with reference to FIG. 8 below.

Figure 8:
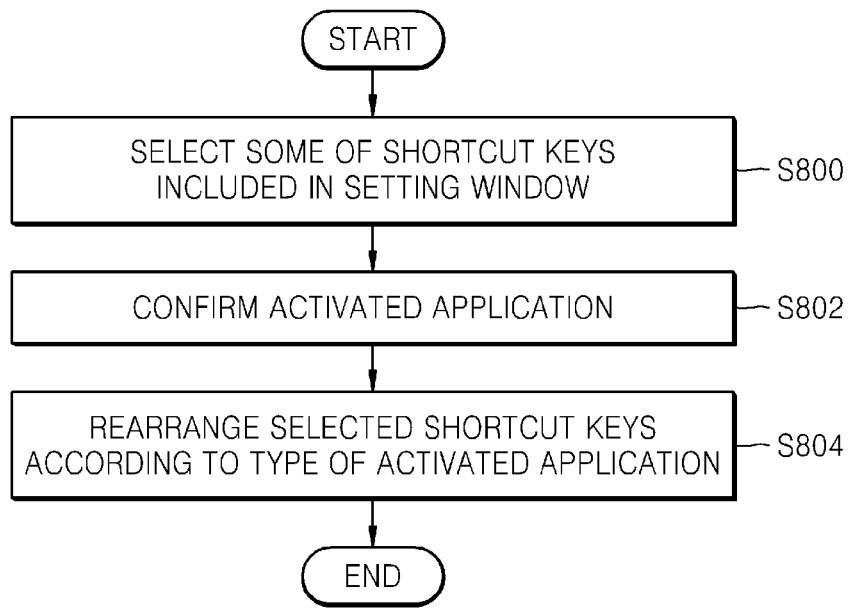
FIG. 8 is a flowchart illustrating a method of arranging shortcut keys on a function window in a user interface according to an embodiment of the present general inventive concept.

FIG. 8 is a flowchart illustrating a method of arranging shortcut keys on a function window in an apparatus according to an embodiment of the present general inventive concept.

In operation S800, a portion of shortcut keys included in a setting window are selected. In operation S800, an apparatus may select a portion of the shortcut keys included in the setting window based on a user selection input. For example, when a user touches a shortcut key included in the setting window, the apparatus may select the touched shortcut key in response to the user's touch, but the present general inventive concept is not limited thereto.

In operation S802, an activated application is confirmed. In operation S802, the apparatus may confirm the activated application, and, when a plurality of applications are activated, the apparatus select one of the plurality of activated applications.

In operation S804, the shortcut keys are rearranged according to a type of the activated application. In operation S804, the apparatus may rearrange the shortcut keys included in the function window according to the type of the activated application. The apparatus may confirm the number of times an operation is performed in each application, and first arrange shortcut keys with respect to operations frequently performed in the activated application in the function window based on the confirmed numbers. For example, if the "application A" performs a function "copy" 7 times, a function "cut" 3 times, and a function "paste" 15 times, the apparatus may rearrange the shortcut keys on the function window in the order of "paste," "copy," and "cut."

A method of highlighting and displaying related shortcut keys on a function window according to an embodiment of the present general inventive concept will now be described with reference to FIG. 9 below.

Figure 9:
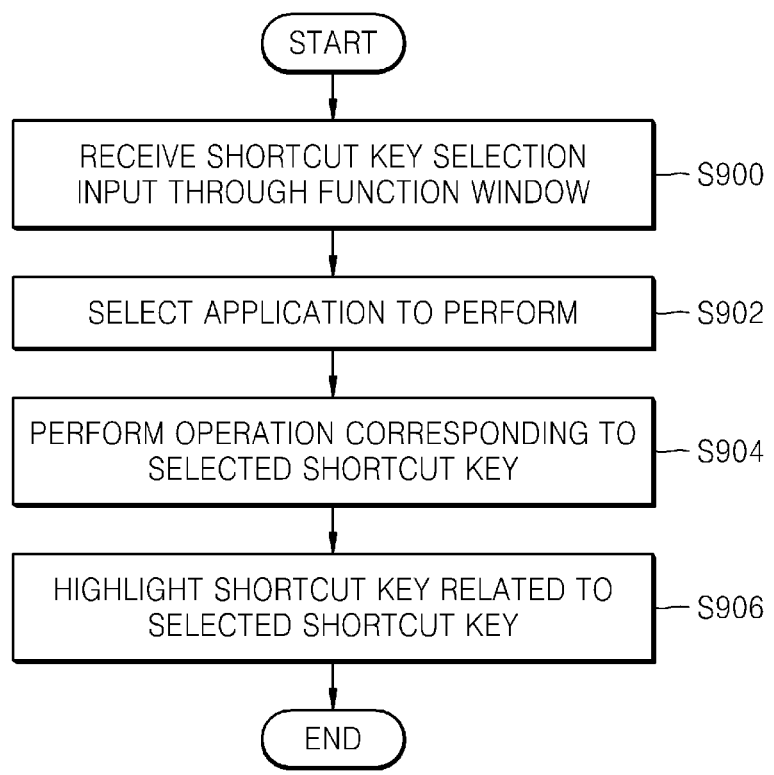
FIG. 9 is a flowchart illustrating a method of highlighting and displaying related shortcut keys in a function window of a user interface according to an embodiment of the present general inventive concept.

FIG. 9 is a flowchart illustrating a method of highlighting and displaying related shortcut keys in a function window in an apparatus according to an embodiment of the present general inventive concept.

In operation S900, a shortcut key selection input is received through the function window. In operation S900, if a user touches a shortcut key included in the function window, an apparatus may select the touched shortcut key in response to the user's touch.

In operation S902, an application is selected automatically or manually through a user interface of an apparatus. In operation S902, the apparatus selects the application to perform an operation of the selected shortcut key. If a plurality of applications of the apparatus are activated, the apparatus may select one or more applications from the activated applications.

In operation S904, the operation corresponding to the selected shortcut key is performed. In operation S904, the apparatus may confirm an activated application, and perform the operation corresponding to the selected shortcut key with respect to the confirmed activated application. Also, if a plurality of applications of the apparatus are activated, the apparatus may perform an operation with respect to an application selected by the user.

In operation S906, a shortcut key related to the selected shortcut key is highlighted. In operation S906, the apparatus may highlight a shortcut key corresponding to an operation related to the performed operation. For example, if a function "copy" is selected and performed in the function window, the apparatus may highlight a shortcut key corresponding to a function "paste" related to the function "copy".

According to the above embodiments, a function window including a plurality of shortcut keys for a common operation performed in a plurality of applications of a device is provided.

Furthermore, a shortcut key for a common operation performed in a plurality of applications is effectively selected and arranged.

Furthermore, a shortcut key related to an executed shortcut key among shortcut keys included in a function window is effectively displayed.

The one or more embodiments of the present invention may be embodied as a computer readable recording medium on which commands, e.g., a program module, that may be executed by a computer are recorded. The computer readable medium may be any of media that may be accessed by a computer, e.g., a volatile medium, a non-volatile medium, a detachable medium, and a non-detachable medium. Also, the computer readable medium may be a computer storage medium or a communication medium. Examples of the computer storage medium may include a volatile medium, a non-volatile medium, a detachable medium, and a non-detachable medium that employ a method or technology for storing computer readable commands, data structures, program modules, or other data. In general, examples of the communication medium may store computer readable commands, data structures, program modules, data contained in a modulated data signal, and other transmission mechanisms. The communication medium may be any information transfer media.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of providing a user interface with respect to a plurality of applications in an apparatus, the method comprising:
    storing operation information regarding common operations performed in the plurality of applications, wherein each common operation is capable of being performed in a plurality of applications installed in the apparatus;
    generating a function window for performing at least one operation performed in the plurality of applications based on the stored operation information; and
    displaying the generated function window.

2. The method of claim 1, wherein the generated function window comprises shortcut keys corresponding to the common operations.

3. The method of claim 2, further comprising: if the shortcut keys included in the function window are selected, performing operations corresponding to the selected shortcut keys with respect to an activated application.

4. The method of claim 3, wherein the generating of the function window comprises, if the operations corresponding to the selected shortcut keys are performed, highlighting and displaying shortcut keys related to the selected shortcut keys.

5. The method of claim 2, wherein the generating of the function window comprises rearranging the shortcut keys according to an activated application.

6. The method of claim 1, further comprising:
    generating a setting window including a plurality of shortcut keys with respect to the common operations performed in the plurality of applications; and
    receiving a user selection input through the generated setting window,
    wherein the generating of the function window comprises arranging shortcut keys corresponding to operations selected based on the user selection input.

7. The method of claim 1, wherein the storing of the operation information comprises storing the operation information regarding the common operations performed in the plurality of applications based on a user input signal.

8. The method of claim 1, wherein the generating of the function window comprises selecting shortcut keys of operations to be included in the function window based on numbers of times the common operations are performed in the plurality of applications.

9. The method of claim 1, wherein the displaying of the generated function window comprises displaying the function window as a popup window.

10. A non-transitory computer readable recording medium having recorded thereon a computer program to execute the method of claim 1.

11. An apparatus to provide a user interface with respect to a plurality of applications, the apparatus comprising:
    an operation information storage unit to store operation information regarding common operations performed in the plurality of applications, wherein each common operation is capable of being performed in a plurality of applications installed in the apparatus;
    a function window generating unit to generate a function window to perform at least one operation performed in the plurality of applications based on the stored operation information; and
    a display unit to display the generated function window.

12. The apparatus of claim 11, wherein the generated function window comprises shortcut keys corresponding to the common operations.

13. The apparatus of claim 12, further comprising:
    an operating performing unit to perform operations corresponding to the selected shortcut keys with respect to an activated application when the shortcut keys included in the function window are selected.

14. The apparatus of claim 13, wherein the function window generating unit highlights and displays shortcut keys related to the selected shortcut keys when the operations corresponding to the selected shortcut keys are performed.

15. The apparatus of claim 12, wherein the function window generating unit rearranges the shortcut keys according to an activated application.

16. The apparatus of claim 11, further comprising:
    a setting window generating unit to generate a setting window including a plurality of shortcut keys with respect to the common operations performed in the plurality of applications,
    wherein the function window generating unit arranges shortcut keys corresponding to operations selected based on a user selection input through the generated setting window.

17. The apparatus of claim 11, wherein the operation information storage unit stores the operation information regarding the common operations performed in the plurality of applications based on a user input signal.

18. The apparatus of claim 11, wherein:
    the operation information storage unit selects stored numbers of times the common operations are performed in the plurality of applications; and
    the function window generating unit selects shortcut keys of operations to be included in the function window based on the numbers.

19. An apparatus comprising:
    an operation performing unit to perform one or more operations of one or more applications;
    a window generating unit to generate a user interface with a function window having one or more shortcut keys corresponding to performed common operations of the applications, wherein each common operation is capable of being performed in a plurality of applications installed in the apparatus; and
    a display unit to display the generated user interface.

20. The apparatus of claim 19, further comprising:
a setting window generating unit to generate a setting window having a plurality of shortcut keys corresponding to performed operations of the applications,
wherein the one or more shortcut keys of the function window are selected from the shortcut keys of the setting window.

21. The apparatus of claim 19, wherein the shortcut keys of performed common operations of the applications are selected and arranged according to a user preference.

22. An apparatus comprising:
an operation performing unit to perform one or more operations of one or more applications;
an operation information storage unit to store operation information regarding common operations performed in the applications, wherein each common operation is capable of being performed in a plurality of applications installed in the apparatus;
a window generating unit to generate a user interface with a function window having one or more shortcut keys corresponding to performed common operations of the applications; and
a display unit to display the generated user interface.

* * * * *